Sept. 8, 1953                A. W. TONDREAU ET AL                 2,651,233
                          PROCESS OF COMPOSITE PHOTOGRAPHY
Filed Feb. 6, 1950
                                                              4 Sheets-Sheet 1

ALBERT W. TONDREAU
FRED W. GAGE
            INVENTORS

BY

ATTORNEY

Sept. 8, 1953     A. W. TONDREAU ET AL     2,651,233
PROCESS OF COMPOSITE PHOTOGRAPHY
Filed Feb. 6, 1950     4 Sheets-Sheet 2
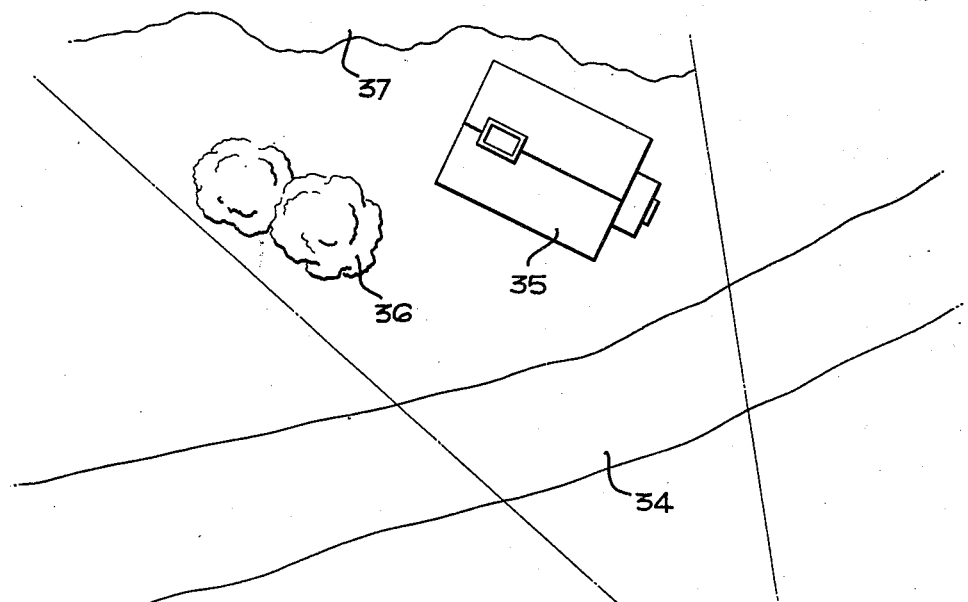
Fig. 2.
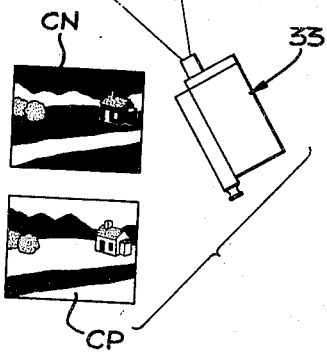
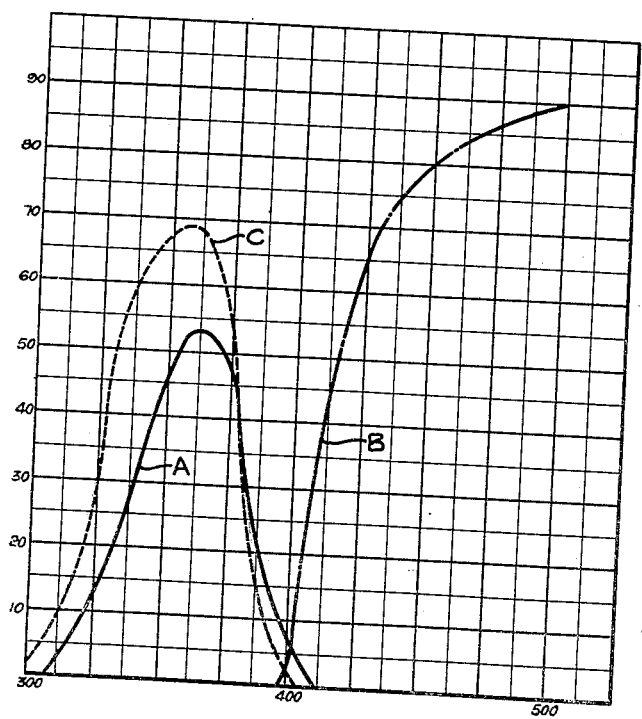
Fig. 3.
ALBERT W. TONDREAU
FRED W. GAGE
INVENTORS
BY
ATTORNEY

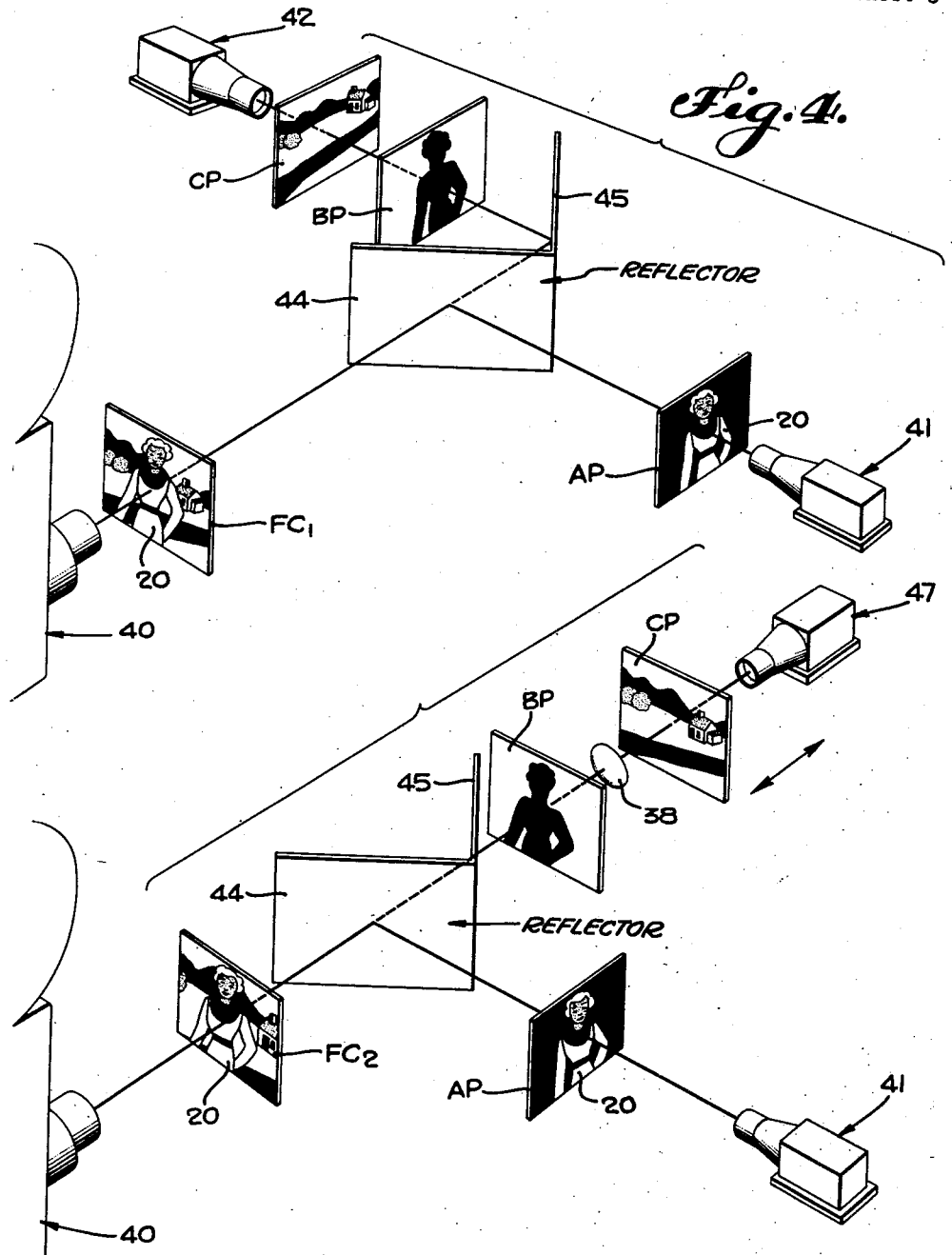

Sept. 8, 1953

A. W. TONDREAU ET AL 2,651,233

PROCESS OF COMPOSITE PHOTOGRAPHY

Filed Feb. 6, 1950

ALBERT W. TONDREAU
FRED W. GAGE
INVENTORS

BY

ATTORNEY

Patented Sept. 8, 1953

2,651,233

UNITED STATES PATENT OFFICE 2,651,233

PROCESS OF COMPOSITE PHOTOGRAPHY

Albert W. Tondreau, Westwood Village, and Fred W. Gage, Beverly Hills, Calif., assignors to Warner Bros. Pictures, Inc., Burbank, Calif., a corporation of Delaware Application February 6, 1950, Serial No. 142,616

1 Claim. (Cl. 88—16)

This invention relates to the production of motion pictures, and particularly to a method of and system for photographing a scene or scenes as components of a final picture and for combining the components.

In the art of motion picture production, the use of masks or mattes produced by different color spectrums is well-known, some of these prior systems being disclosed in U. S. Patents No. 2,461,127 of February 8, 1949, No. 1,897,494 of February 14, 1933, No. 2,173,518 of September 19, 1939, and many others, Patent No. 1,933,854 of November 7, 1933, disclosing the use of varying intensities of ultra-violet light in a rear-projection screen type of process photography. The present invention is an improvement of this general type of photography to provide masks and picture components which can be accurately registered, in which variations in density between foreground and background components can be controlled, and most important of all, in which the correct color values and definitions of the actual objects are provided. For instance, many of the former methods of process color photography used to obtain simultaneously a foreground component and the mask therefor, do not obtain any images of such elements as cigar or cigarette smoke or water in a glass. This is because of the spectrum separation used which does not permit all objects to register as an image on the emulsion, and thus, the final pictures are not commercial according to present-day standards.

Furthermore, all prior systems were limited to a very shallow depth of focus; that is, the foreground was limited in its movements to a narrow region in front of a screen. This was because the prior systems used fixed lens positions. The present invention permits the focus of the lenses to be adjusted during the photographing of a scene known as "follow focus," which thereby permits unlimited foreground action to and from the camera, while still providing accurately registering masks.

The present invention, therefore, simultaneously produces a foreground positive with all gradations of light or densities in the scene to record accurately all elements therein and simultaneously an accurately registering mask with no limitations on the movements of the foreground to and from the camera. The positive components and masks may then be combined with one or more background components to produce a final composite picture which appears, in all respects, as though photographed as an original. The chief factor is the selection of the photographing light spectrums and the filters used in front of the cameras and illuminating sources. Another factor is the method of and system for combining the components accurately in proper perspective and registry, the general method being of the type disclosed in Patent No. 2,204,049 of June 11, 1940.

The principal object of the invention, therefore, is to facilitate the production of composite motion pictures.

Another object of the invention is to provide an improved method of and system for photographing components of a picture and a mask therefor.

A further object of the invention is to provide an improved method of and system for combining components of a picture photographed at different times.

A still further object of the invention is to provide an improved system of color separation for a foreground scene and a matte therefor.

A still further object of the invention is to provide an improved method of and system for combining foreground components, masks, and background components in registry and in different ratios.

Although the novel features which are believed to be characteristic of this invention will be pointed out with particularity in the appended claim, the manner of its organization and the mode of its operation will be better understood by referring to the following description, read in conjunction with the accompanying drawings, forming a part hereof, in which:

Fig. 2 is a diagrammatic view of the photographing system for obtaining a background component.

Fig. 3 is a graph showing the cut-offs of the filters used in the invention.

Fig. 4 is a diagrammatic view showing how the foreground and background components are combined.

Fig. 5 is a diagrammatic view showing how the foreground and background components may be combined in different ratios.

Figure 1:
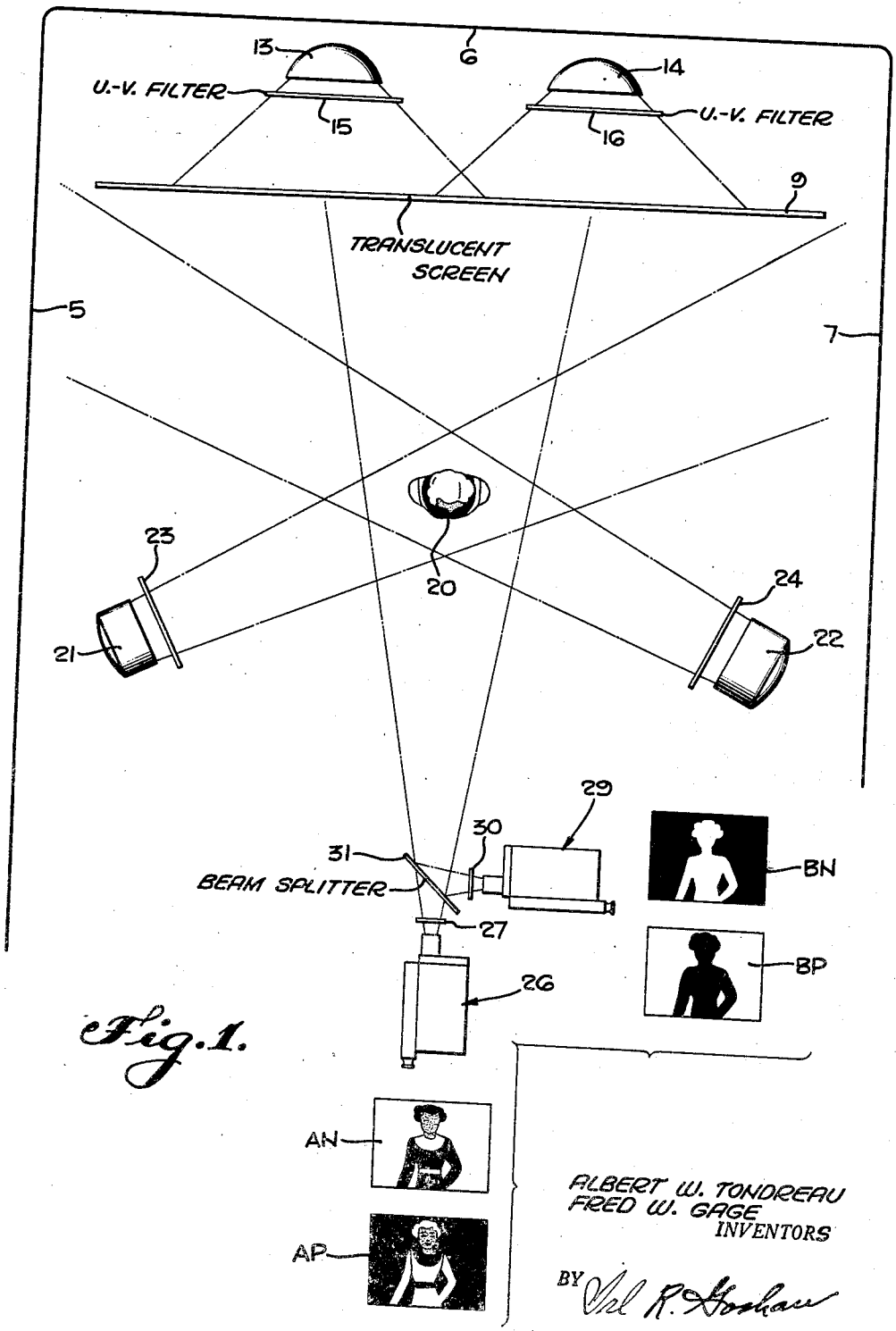
Fig. 1 is a diagrammatic view of the photographing system for simultaneously obtaining a foreground and mask therefor.

Referring now to Fig. 1, one end of a stage is represented by walls 5, 6, and 7, within which is positioned a translucent screen 9. Behind screen 9, is a pair of arc light sources 13 and 14, rich in ultra-violet light, and which are filtered by filters 15 and 16, respectively, the light thereby reaching the translucent screen lying within the range shown by curve A in Fig. 3. These filters are preferably Corning type 7-39, which have a high heat resisting qualities and which pass a light spectrum having wavelengths between approximately 300 millimicrons and 400 millimicrons.

To represent a foreground component, an actress 20 is shown in front of screen 9, the actress being illuminated by light sources 21 and 22 having light filters 23 and 24, respectively, in front thereof, these filters having a cut-off, as shown by curve B, and which may be a Corning type 3-74. Thus, the light frequencies on translucent screen 9 are substantially entirely devoid of the light frequencies with which the foreground 20 is being illuminated, and, since the cut-off point is approximately 400 millimicrons, all visible light frequencies are present on the foreground, and, therefore, variations in light intensities of the various elements in the foreground will appear as images in the foreground picture.

To obtain a photograph of the foreground 20 and simultaneously a mask therefor, a camera 26 is used, in front of which is a light filter 27 having light transmitting qualities of the 3-74 Corning type filter, as shown by curve B in Fig. 3. This filter has sufficient heat resisting qualities to make it satisfactory for use at 23 and 24 as well as at 27. Since this filter passes the full visible spectrum, there is no loss in definition of the foreground in the final negative, as shown at AN, or the positive printed therefrom, as shown at AP. However, since the light on the background screen 9 is eliminated by filter 27, the background of AN will be clear and the background of AP will be opaque, but the foreground will have perfect black and white or color density variations of all objects therein.

To obtain the mask for the foreground 20, a camera 29 is used, in front of which is a light filter 30 having light transmitting qualities similar to filters 15 and 16, as shown by curve C in Fig. 3, this filter being preferably a Corning type 7-60, since it is not necessary for this filter to have heat resisting qualities. A light dividing reflector-transmitter or beam splitter is used at 31 to divide the light between cameras 26 and 29, as is well-known in the art. Because of filters 15, 16, and 30, the light reaching camera 29 will be only that from screen 9, and the negative in the camera will appear as shown at BN and the positive as shown at BP, wherein the background of the negative is opaque and the foreground thereof clear, while the positive will have the reverse densities. The cameras 26 and 29 are operated in synchronism, or may be a camera of the type shown in Tondreau Patent No. 2,422,270 of June 17, 1947, having a single frame pull-down and a 170-degree shutter opening. There is thus provided a foreground picture component and simultaneously a matte therefor in exact registry with no deterioration in foreground picture quality because of the light spectrums employed. This spectrum division provides accurate foreground densities for both color and black and white components.

To obtain an appropriate background component, normal photography is used. That is, in accordance with the script or story, a background is photographed as shown in Fig. 2 by any standard type of camera 33, the photographed scene including, for example, a stream 34, a house 35, trees 36, and a hill outline 37. Assuming the sky above the hill line 37 is clear and free of clouds, the negative of the scene in Fig. 2 will appear as shown at CN, and the positive printed therefrom will appear as shown at CP as a normal photograph.

To illustrate the simple combination of the foreground component as shown on print AP and the background component as shown on print CP, reference is made to Fig. 4, showing a camera 40, and light houses and projectors 41 and 42, the prints AP, BP, and CP being shown large in proportion to the units 40, 41, and 42 for purposes of illustration. A right-angled partial reflector with sections 44 and 45 is used to combine the components. With the arrangement shown in Fig. 4, the final composite as impressed on the film in camera 40 will appear as shown at FC$_1$ and includes the foreground 20 of print AP and the background of print CP. The light through print AP is reflected to camera 40 by the front surface of section 44, and the light through print CP, not stopped by the opaque portion of matte BP, is reflected by section 45 and transmitted by section 44 to camera 40. Since the projectors 41 and 42 are adjustable and the matte exactly corresponds to the outline of foreground 20 and the projectors 41 and 42 and camera 40 are operated in synchronism, the final positive from camera 40 will be as shown at FC$_1$. The film sequences will be run simultaneously and the matte will accurately register for all frames.

In Fig. 5, a system is illustrated, whereby the relative size between the foreground component 20 and the background may be varied. In this instance, a projector unit 47 is coaxially positioned with respect to camera 40 and the background positive CP and matte BP placed between reflector-transmitter 44—45 and the projector 47. By varying the position of CP, various smaller portions thereof may be combined with foreground 20, thus giving a different perspective in the final composite scene as shown at FC$_2$. It will be noted that a lens 38 is shown between matte BP and background CP, this lens representing a "zoom" optical unit, which is adjusted with the axial movement of CP and projector 47 to provide the desirable proportion of CP with respect to AP. Mask BP stays fixed at all times, since it must correspond with 20 in AP. The films are advanced by intermittent mechanisms not shown, but since they are advanced in synchronism, perfect registry is obtained. The mechanisms for advancing the respective films are disclosed and claimed in co-pending application, Ser. No. 192,927, filed October 30, 1950, now Patent No. 2,622,475, issued December 23, 1952.

Figure 6:
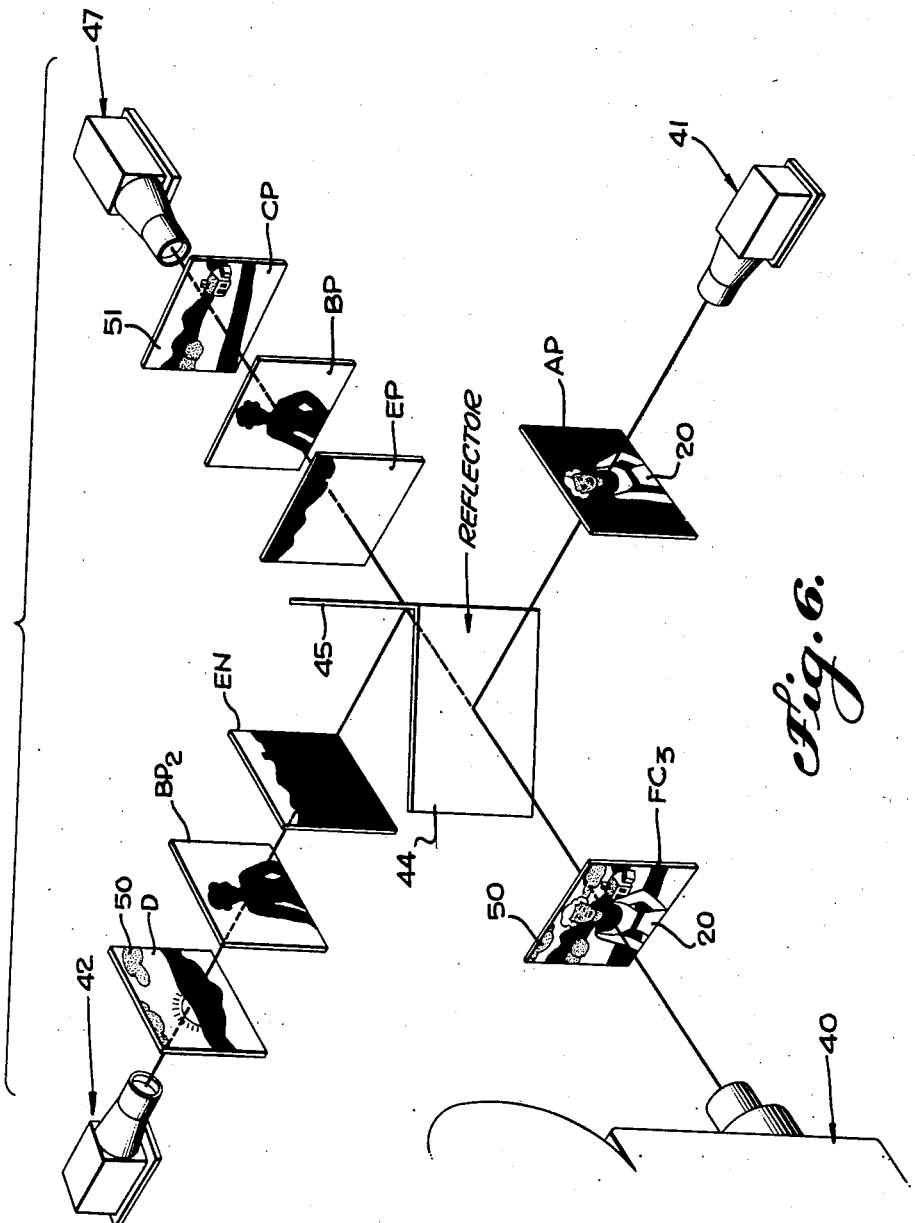
Fig. 6 is a diagrammatic view showing how the foreground component may be combined with a plurality of background components.

To combine two background components with a foreground component, the three projectors 41, 42, and 47 are used, the background component CP being given any fixed size ratio with respect to foreground 20, as explained and shown in Fig. 5. Let us assume it is desired to place some clouds 50, shown on print D of Fig. 6 obtained previously in the manner shown in Fig. 2, in the sky portion 51 of print CP. Two masks EN and EP are then made. This is accomplished by projecting CP on an opal glass and painting out the sky portion and then photographing the glass. By projecting and photographing with the same lens, perfect registry is obtained. The matte EN is then placed in front of print D. A print of EN produces mask EP, which is placed in front of matte BP. With EN as shown, only light from the cloud portion 50 will reach camera 40 from reflector 45 and transmitter 44. When EP is placed in front of matte BP, its opaque portion will block all light from the sky section of CP and BP will block all light from foreground 20. Thus, the final composite will appear as shown at FC3, and will be composed of foreground 20, background CP, and the clouds 50 of D. Since the foreground component 20 extends into the sky and cloud region, a second mask BP2 must also be run in front of sky print D. If component 20 were below the sky line, mask BP2 is not necessary. Furthermore, to use masks EN and EP, the sky line of CP must be constant and different masks made when it changes. Background masks may be made on stages in the manner shown in Fig. 1.

By use of the filters mentioned above on the foreground illuminating light sources, corresponding filters on the foreground photographing camera, the filters mentioned above on the background light source, and corresponding filters on the matte camera, all filters having respective adjacent cut-offs at approximately 400 millimicrons, an accurate foreground positive image is produced having densities varying in accordance with not only the black and white light and shade values of the foreground, but in accordance with all color values when color film is used for composite color photography, which has not been possible with prior systems using complementary color separation. The system also provides a clear opaque background for the foreground component and an accurately registering matte having a clear opaque foreground and a clean clear background for transmission of the background light variations. Furthermore, lenses of different focal lengths are useable at any time without deterioration of the sharpness of the foreground matte images. Thus, a commercial composite method and system is obtained for both black and white and color composite photography.

To vary the relative densities between those in foreground 20 of AP and those in the backgrounds CP and 50 of D, the light intensities projecting the respective components may be varied. For instance, an evening scene may be made by reducing the light pattern making up the background components. It is also understood that when color foreground and background components are used, the color values may be varied by varying the type of lamps in the projectors or the intensities thereof as disclosed and claimed in the above-identified co-pending application.

We claim:

A composite photographing process for obtaining two images of a subject, the one having a background of a greater density and the other a background of lesser density, which comprises positioning the subject in front of a translucent screen; placing illuminating means rich in ultraviolet light back of said screen; illuminating said screen with light from said means through a light filter which transmits only light rays having wavelengths below approximately 400 millimicrons, whereby to eliminate the visible spectrum from said illuminating means through said screen; positioning a light source in front of said screen and illuminating the said subject from said source through a filter which transmits light rays having wavelengths above approximately 400 millimicrons, whereby the said subject is illuminated with light containing the full visible spectrum; providing two light sensitive photographic areas with means for focusing an image on said areas in front of said subject; providing a light filter in front of each of said areas, one of said filters transmitting light rays below approximately 400 millimicrons and the other of said filters transmitting light rays above approximately 400 millimicrons; providing a light diverting reflector-transmitter between the two filters last mentioned to divide the light from said screen and subject reaching said areas between them, whereby when said light sensitive areas are developed the positive printed from the area screened by the filter which transmits only light rays above approximately 400 millimicrons will be opaque and the subject in said positive will have sharp color density variations, and whereby the positive printed from the area screened by the filter which transmits only light rays below approximately 400 millimicrons will have a clear background of no density and the subject will appear opaque and without color variations, thus providing a mask of the said subject.

ALBERT W. TONDREAU.
FRED W. GAGE.

References Cited in the file of this patent

UNITED STATES PATENTS

| Number | Name | Date |
|---|---|---|
| 1,801,450 | Owens | Apr. 21, 1931 |
| 1,869,819 | Mammes | Aug. 2, 1932 |
| 1,907,253 | Debrie | May 2, 1933 |
| 1,945,926 | Tolhurst | Feb. 6, 1934 |
| 1,960,373 | Dreyer | May 29, 1934 |
| 1,982,210 | Gillette | Nov. 27, 1934 |
| 1,982,211 | Gillette | Nov. 27, 1934 |
| 2,024,081 | Williams | Dec. 10, 1935 |
| 2,028,975 | Gillette | Jan. 28, 1936 |
| 2,461,127 | Pickley | Feb. 8, 1949 |

FOREIGN PATENTS

| Number | Country | Date |
|---|---|---|
| 444,435 | Great Britain | Mar. 20, 1936 |
| 502,890 | Great Britain | June 23, 1937 |
| 633,420 | Great Britain | Dec. 19, 1949 |